United States Patent [19]

Yokoyama

[11] Patent Number: 5,086,748
[45] Date of Patent: Feb. 11, 1992

[54] FUEL SUPPLYING SYSTEM FOR GAS ENGINE

[75] Inventor: Yoshiharu Yokoyama, Iwata, Japan

[73] Assignee: Yamaha Hatsudoki Kabushiki Kaisha, Iwata, Japan

[21] Appl. No.: 633,151

[22] Filed: Dec. 6, 1990

Related U.S. Application Data

[63] Continuation of Ser. No. 337,481, Jul. 10, 1989, abandoned.

[30] Foreign Application Priority Data

Jul. 9, 1988 [JP] Japan .................. 63-171292

[51] Int. Cl.⁵ ............................................ F02M 31/00
[52] U.S. Cl. ................................. 123/549; 123/557; 123/527; 123/552; 123/545
[58] Field of Search ............... 123/557, 552, 545, 547, 123/549, 527; 60/320

[56] References Cited

U.S. PATENT DOCUMENTS

| | | |
|---|---|---|
| 2,908,143 | 10/1959 | Price . |
| 3,306,273 | 2/1967 | Dolphin . |
| 4,098,079 | 7/1978 | Ueda . |
| 4,099,499 | 7/1978 | Giardini et al. ............ 123/557 |
| 4,228,776 | 10/1980 | Gallione et al. ............ 123/549 |
| 4,259,937 | 4/1981 | Elliott .......................... 123/549 |
| 4,336,783 | 6/1982 | Henson ....................... 123/557 |
| 4,345,141 | 8/1982 | Little ........................... 123/549 |
| 4,398,523 | 8/1983 | Henson ....................... 123/557 |
| 4,539,108 | 9/1985 | Izutani et al. ............... 123/557 |
| 4,811,720 | 3/1989 | Katumata et al. .......... 123/549 |
| 4,846,137 | 7/1989 | Ray ............................. 123/557 |
| 4,883,040 | 11/1989 | Rocky .......................... 123/557 |

FOREIGN PATENT DOCUMENTS

| | | |
|---|---|---|
| 811848 | 1/1937 | France . |
| 85436 | 6/1956 | France . |
| 1257015 | 2/1961 | France . |
| 1382225 | 11/1964 | France . |
| 1443341 | 5/1966 | France . |
| 2192269 | 7/1972 | France . |
| 2354507 | 6/1976 | France . |
| 62-143056 | 9/1987 | Japan . |
| 2006546 | 5/1979 | United Kingdom . |

OTHER PUBLICATIONS

Patent Abstracts of Japan, vol. 11, no. 196 & JP-A-62 20 668; 1-1987.
Patent Abstracts of Japan, vol. 9, no. 206 & JP-A-60 65 996; 8-1985.
Patent Abstracts of Japan, vo. 11, no. 28 & JP-A-61 200 361; 6-1987.
Patent Abstracts of Japan, vol. 8, no. 104 & JP-A-59 15 633; 5-1984.
Patent Abstracts of Japan, vol. 13, no. 36 & JP-A63 246 459.

Primary Examiner—Andrew M. Dolinar
Assistant Examiner—M. Macy
Attorney, Agent, or Firm—Ernest A. Beutler

[57] ABSTRACT

Several embodiments of gaseous fuel supplying systems for an internal combustion engine used to power a portable generator. In each embodiment, heat is supplied to the fuel so as to maintain the fuel pressure if the fuel pressure falls below a predetermined pressure. In some embodiments, the heat supply is on-off and in other embodiments it is variable. In certain embodiments, the heat is supplied electrically and in another embodiment, the heat is extracted from the engine. In addition, one embodiment incorporates a cold starting arrangement wherein fuel is supplied to the engine for cold starting at full container pressure.

15 Claims, 4 Drawing Sheets

FUEL SUPPLYING SYSTEM FOR GAS ENGINE

This is a continuation of U.S. Pat. application Ser. No. 377,481, filed July 10, 1989 entitled: Fuel Supplying System for Gas Engine, now abandoned.

BACKGROUND OF THE INVENTION

This invention relates to a fuel supplying system for a gas engine and more particularly to an improved gaseous fuel supply system for an internal combustion engine.

In one form of internal combustion engine, the engine is supplied with pressurized gaseous fuel supplied from a pressurized container. The fuel, commonly known as liquified petroleum gas (LPG) is in a liquid form in the container but becomes a gaseous fuel when discharged from the container and supplied to the engine. Even though the gas pressure is regulated by a regulating device, the evaporization of the fuel from the liquid to the gaseous form reduces its temperature and the reduced temperature of the fuel supplied to the engine produces certain difficulties. When the temperature of the fuel is reduced below a certain value, improper vaporization will result and engine running can become unsatisfactory. This reduction in fuel temperature can occur under situations where there is high fuel consumption due to high loads or under low ambient temperature conditions.

In order to obviate these problems, it has been proposed to heat the fuel in the container or, alternatively, to heat the pressure regulator. Although these solutions seem satisfactory at first, it has been found that they are not truly effective. The reason for this is that the amount of heat necessary to maintain the appropriate gas temperature varies and the ambient temperature conditions which surround the container have made it difficult, if not impossible, to obtain the proper degree of heating under all ambient conditions.

It is, therefore, a principal object of this invention to provide an improved arrangement for heating the fuel supplied to a gas burning internal combustion engine so as to maintain the appropriate fuel temperature under all conditions.

It is a further object of this invention to provide an improved arrangement for heating the gaseous fuel supplied to an internal combustion engine.

It is a further object of this invention to provide a gaseous fuel heating device that is substantially independent of ambient temperature and which will provide the appropriate degree of heat under all conditions.

In prior art systems employing pressure regulators, there is also a difficulty in cold starting. If the temperature of the fuel is too low, regulated fuel pressure may not be sufficient to provide adequate fuel for starting. It is, therefore, another object of this invention to provide an improved cold starting arrangement for a gaseous fuel engine.

SUMMARY OF THE INVENTION

A first feature of this invention is adapted to be embodied in a fuel supply system for operating an internal combustion engine from a source of pressurized gaseous fuel. A container is incorporated for containing the fuel under pressure and means are incorporated for sensing the pressure of the fuel in the container. In accordance with this feature, means apply heat to the fuel when the pressure is below a predetermined value.

A further feature of this invention is also adapted to be embodied in a fuel supply system for operating an internal combustion engine from a source of pressurized gaseous fuel. The fuel is supplied to the engine through a conduit in which pressure regulating means is positioned. In accordance with this feature, a cold starting arrangement is incorporated wherein fuel is supplied to the engine for cold starting at full unregulated pressure.

DETAILED DESCRIPTION OF THE PREFERRED EMBODIMENTS

Figure 1:
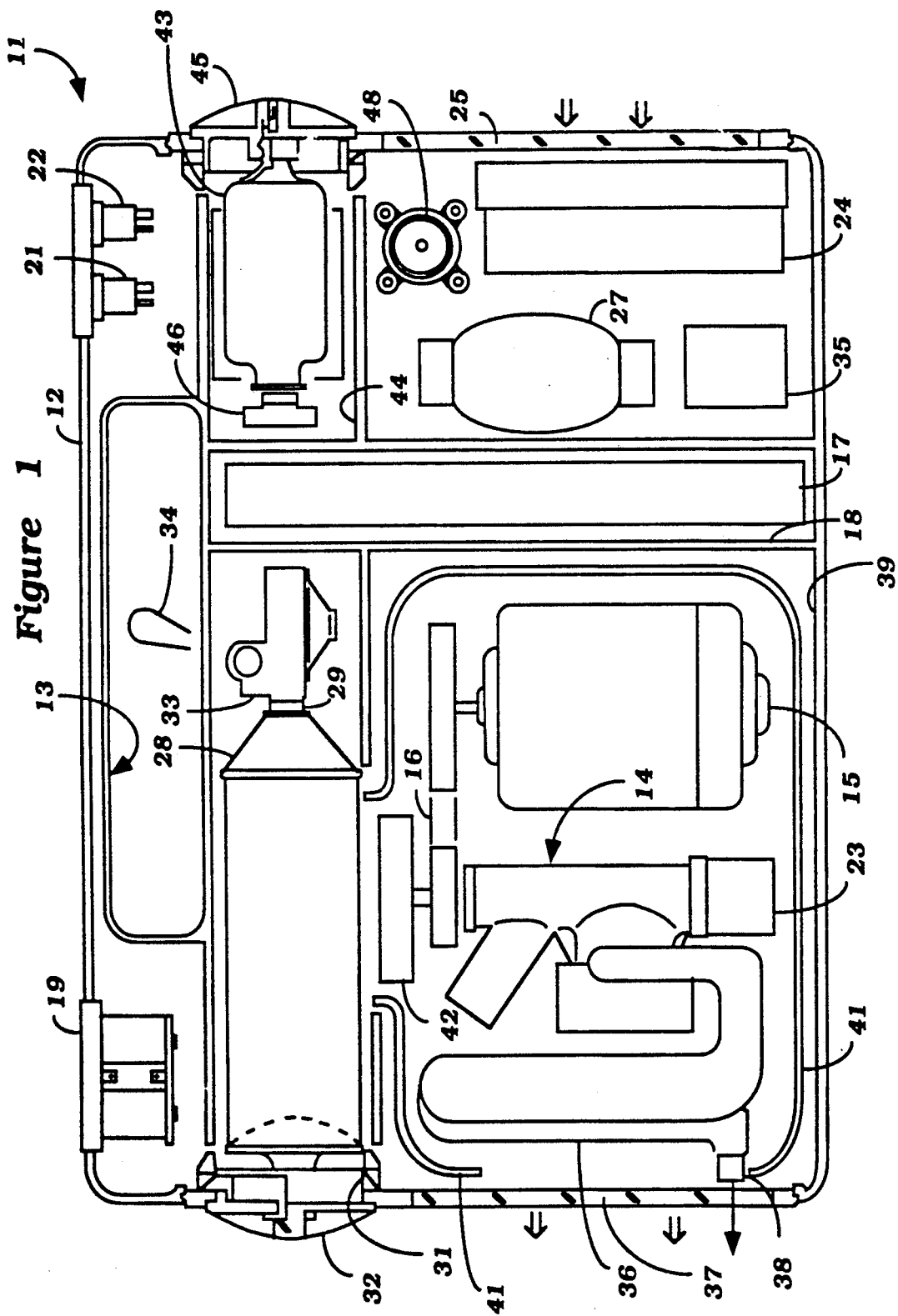
FIG. 1 is a cross-sectional view taken through a portable power supply constructed in accordance with an embodiment of the invention.
Figure 2:
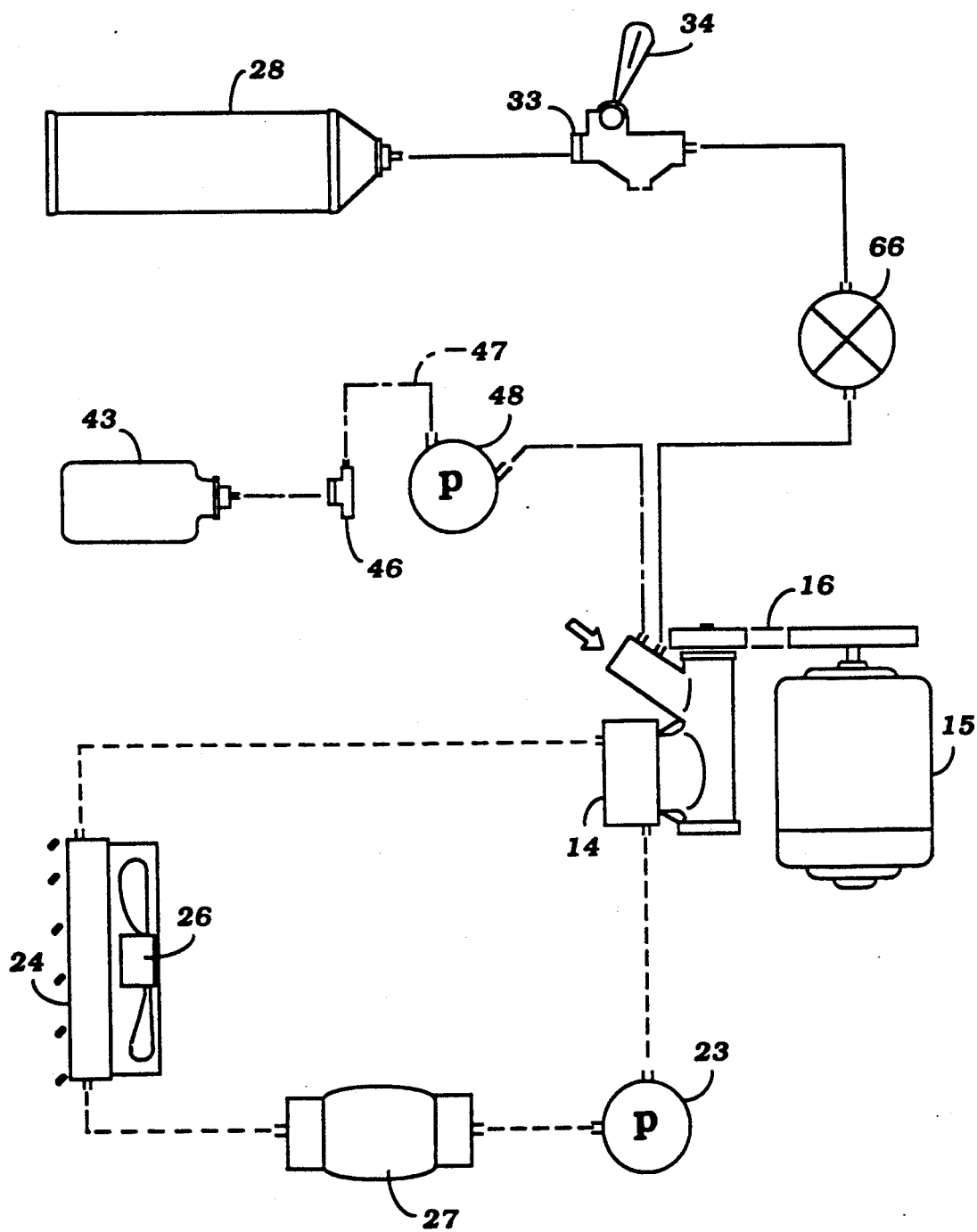
FIG. 2 is a partially schematic view showing the components of the power supply and their interrelationship.

Referring first primarily to FIGS. 1 and 2, a compact portable electric power supply constructed in accordance with an embodiment of the invention is identified generally by the reference numeral 11. The invention is described in conjunction with a portable power supply since such devices advantageously run on LPG fuel. However, it is to be understood that the invention can be utilized in other applications wherein an internal combustion engine is supplied with a liquefied gaseous fuel and the fuel is supplied to the engine in gaseous form.

The power unit 11 is comprised of an outer housing, indicated generally by the reference numeral 12, and which contains all of the components of the power supply. The outer housing 12 may be formed from any suitable material such as a molded plastic and is formed with a carrying handle 13 formed by an opening at its upper end.

Contained with the outer housing 12 is a single cylinder, liquid cooled, small displacement internal combustion engine, indicated generally by the reference numeral 14. In the illustrated embodiment, the engine 14 is operated under the two-stroke, crankcase compression principle, however, it should be readily apparent to those skilled in the art that the engine 14 may be a four-stroke cycle engine and may have other than a single cylinder and, in fact, may be a rotary or other type of engine than a reciprocating engine.

The engine 14 has its output shaft connected to a shaft of a combined starter and generator 15 by means of a driving belt 16. The starter, generator 15 is coupled with an electrical circuit that includes a vertically positioned battery 17 contained within a compartment 18 formed by the outer housing 12. This circuit permits the starter, generator 15 to operate as a starter so as to start the engine 14. Once the engine 14 commences running, the starter, generator 15 will operate as a generator and supply a charge to the battery 17 and also provide an electrical output to a receptacle 19 carried adjacent the handle 13 so as to permit an electrical device to be plugged in and powered by the unit 11.

There is provided adjacent the handle 13 on the side opposite the receptacle 19 a main control switch 21 for switching the power on and off and a starter switch 22 for operating the starter, generator 15 in its starter mode.

The engine 14 is further provided with a cooling system that includes a coolant pump 23 that is driven by the engine 14 and which circulates coolant through a cooling jacket of the engine and a heat exchanging radiator 24. The radiator 24 is juxtaposed to an air inlet opening 25 formed at one side of the housing 12. There is further provided an electric fan 26 that is powered by the battery 17 and which circulates the air across the core of the radiator 24. The cooling system also includes an accumulator type pressure control device 27 which is comprised generally of an expansible hose section so as to compensate for volume differences in the coolant of the engine 14 as occur during engine operation.

The engine 14 is fueled by a pressurized source of gaseous fuel (LPG) that is contained within a removable container 28 that is detachably connected to a receptacle 29 immediately beneath the handle portion 13. The container 28 is placed into the receptacle 29 through an opening 31 formed at one side of the housing 12 and which opening is normally closed by a closure plug 32.

The receptacle 29 is coupled to a main shutoff valve 33 having a control handle 34 so as to permit the supply of fuel from the container 28 to be shut off from the remainder of the fuel supply circuit for the engine when the power supply 11 is not being utilized.

A conduit connects the main shutoff valve 33 with a duty solenoid valve 66 which controls the flow of fuel to the induction system of the engine 14 in a manner as described in the copending patent application entitled "Gas Engine", U.S. Pat. Ser. No. 377,419, filed July 10, 1989 and assigned to the assignee of this application. The disclosure of that application is incorporated herein by reference.

The engine 14 further includes an exhaust system that is comprised of a muffler 36 that is juxtaposed to an air outlet opening 37 which is formed at the side of the housing 12 opposite to the inlet opening 25. Air which has passed across the engine will then exit from the air outlet opening 37 so as to cool the muffler 36. The muffler 36 also has a discharge opening 38 which registers with the opening 37 for discharge of exhaust gases from within the housing 12.

The engine 14 and generator 15 are contained within a main cavity 39 formed by the outer housing 22 and are surrounded by a protective shield 41 for further heat insulation and ducting. An engine driven fan 42 circulates air from within the housing 12 across the engine 14, muffler 36 and out the opening 37.

The engine 14 is also provided with a lubricating system that receives lubricant from a separate lubricant container 43 that is received within a compartment 44 formed in the outer housing 12 and which is closed by a removable closure plug 45. The lubricant container 43 is of the cartridge type and is connected to a receiver 46 that supplies lubricant to the engine induction system through a conduit, shown schematically at 47 and in which a lubricant control pump 48 is positioned having a construction as described in the copending application entitled "Compact Power Supply And Lubricant Affording Device Therefore", U.S. Pat. Ser. No. 377,480, filed July 10, 1989, and assigned to the assignee of this application. The lubricant pump 48 is designed so as to provide a positive flow of lubricant and also will in effect close the conduit 47 when the engine is not running so that lubricant cannot inadvertently flow from the reservoir 43 to the engine 14. The pump 48 also meters a very small amount of lubricant so as to insure very good lubrication for the engine under all running conditions and to avoid excess lubricant flow and consumption.

Figure 4:
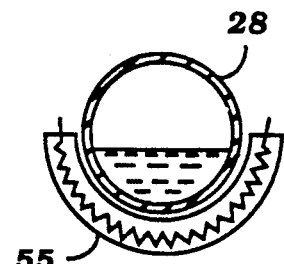
FIG. 4 is a cross-sectional view taken along the line 4—4 of FIG. 3.
Figure 3:
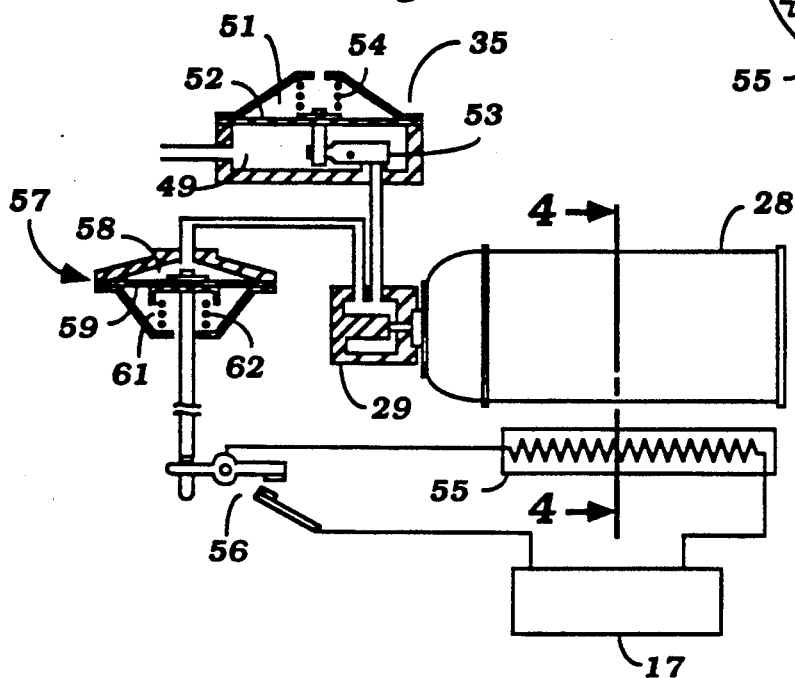
FIG. 3 is a partially schematic view showing the fuel supply system and heating arrangement constructed in accordance with a first embodiment of the invention.

As has been previously mentioned, the evaporation of the fuel from its liquid form in the container 28 to its gaseous form which occurs upstream of the pressure regulator 34 has a tendency to reduce the temperature of the liquid fuel. Such reduced temperatures tend to cause a more dense or richer fuel mixture to be supplied to the engine than required with resulting poor efficiency and also can give rise to certain other problems. In accordance with the invention, a heating arrangement as shown in FIGS. 3 and 4 is provided for insuring that the temperature of the gaseous fuel is fairly constant.

Referring now in detail to this embodiment, the pressure regulator 34 is shown in detail and it comprises an outer housing that is divided into a gas pressure chamber 49 and an atmospheric pressure chamber 51 by means of a diaphragm 52. The diaphragm 52 is connected to a throttle valve 53 for regulating the pressure of the gas which is delivered to the engine 14. A coil compression spring 54 is contained within the atmospheric chamber 51 and sets the pressure at which the regulator will dispense the fuel.

The fuel container 28 is at least partially encircled by an electric heating element 55 that is powered from the battery 17 through a switch 56. The switch 56 is opened and closed in response to the pressure of the gas within the container 28 since it has been found that the gas pressure is indicative of the temperature and also the amount of heat which is required in order to provide stable operation. To this end, there is provided a switch actuator, indicated generally by the reference numeral 57, which includes a gas pressure chamber 58 that receives gas at the fitting 29 from the container 28 and thus senses unregulated pressure of the gas. A diaphragm 59 closes the chamber 58 and forms an atmospheric chamber 61 that is opened to atmospheric pressure and which receives a coil compression spring 62 for setting the pressure at which the switch 56 will close and complete the circuit to the electrical heating element 55.

The system of this embodiment operates so as to close the switch 56 when the gas pressure in the fitting 29 is below a predetermined pressure at which it is determined that heating is required. As the container 28 is heated, the gas pressure will increase and the pressure sensing device 57 will open the switch once the predetermined pressure is exceeded. In this way, an adequate and appropriate amount of heat will be provided and overheating is also guarded against.

Figure 5:
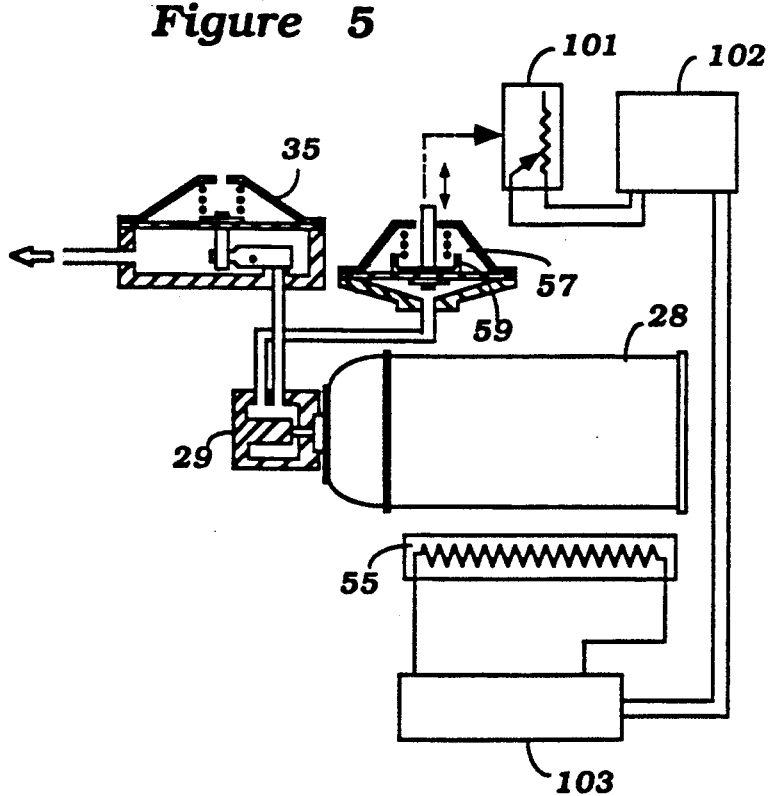
FIG. 5 is a partially schematic view, in part similar to FIG. 3, showing a further embodiment of the invention.

FIG. 5 shows another embodiment of the invention which is generally similar to the embodiment of FIGS. 3 and 4. In this embodiment, however, the control for the electrical heater 55 is a proportional rather than an on-off control. To that end, the diaphragm 59 of the pressure sensing device 57 is coupled to the wiper of a variable potentiometer 101 which outputs a signal indicative of pressure to a heater control circuit 102. The heater control circuit 102 controls a power source 103 for the heater 55, which may include the battery 17, so as to provide a degree of heating that is inversely proportional to the pressure. That is, as the pressure decreases, the amount of heat applied increases. In all other regards, this embodiment is the same as those previously described and has the advantages of those previously described embodiments.

Figure 6:
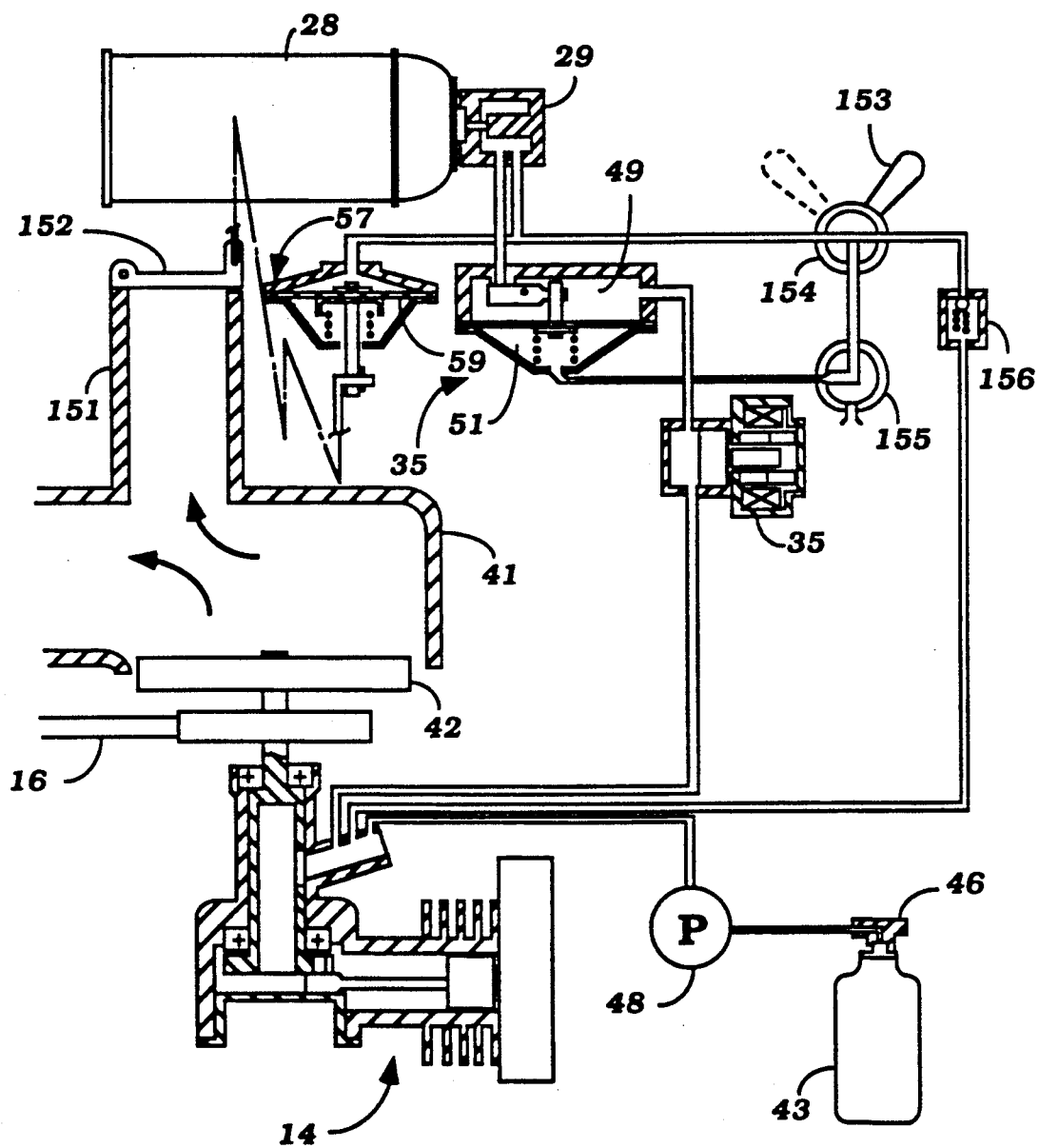
FIG. 6 is a schematic view, in part similar to FIGS. 3 and 5, and shows yet another embodiment of the invention and one which further incorporates an improved arrangement for cold starting.

In the embodiments of the invention as thus far described, the heat for the fuel has been supplied by an electrical heater. However, it is also possible to supply heat for the fuel contained in the reservoir 28 directly from the engine 14 and FIG. 6 shows such an embodiment. Furthermore, this embodiment illustrates an arrangement wherein unregulated fuel pressure may be supplied to the engine 14 under operator control for cold starting.

Referring now in detail to this embodiment, it will be noted that the cooling shroud 41 surrounding the engine 14 is provided with a branch passageway 151 that is directed toward the fuel reservoir 28 and which has a pivotally supported valve 152 extending across its mouth adjacent the reservoir 28. The valve 152 is coupled through a linkage system to the diaphragm 59 of the fuel pressure sensing device 57 so that when the fuel pressure is low, the valve 152 will be opened and heat from the engine is delivered to the fuel in the reservoir 28 for heating it. In this embodiment, the degree of heat supplied will depend inversely upon the pressure of the fuel as sensed by the sensing device 57 so that this embodiment is continuously variable like the embodiment of FIG. 5.

In this embodiment, as previously noted, there is further provided a cold starting lever 153 that operates a pair of valves 154 and 155 simultaneously so as to provide unregulated fuel from the reservoir 28 to the engine 14 under operator control for cold starting. The solid line view of FIG. 6 illustrates the cold starting condition and, in this condition, the valve 154 permits unregulated fuel pressure from the same line that supplies the pressure sensing device 57 to flow directly to the engine induction passage through a one-way check valve 156. The check valve 156 precludes reverse flow but will permit the high pressure fuel to flow to the engine for cold starting. The valve 154 in conjunction with the valve 155 also supplies full gas pressure to the atmospheric chamber 51 of the regulator 35 so as to hold the regulator in its off position so that no fuel will be supplied through the normal fuel passage. The supply of this high pressure fuel to the engine 14 will insure sufficient fuel for cold starting even if the fuel temperature is quite low. Once cold starting has been effected, the operator shifts the cold start valve 153 to the phantom line position which, in effect, closes the valve 154 and opens the valve 155 so that the atmospheric chamber 51 of the pressure regulator 35 will then be exposed to atmospheric pressure and the system will operate as aforedescribed.

It should be readily apparent from the foregoing description that a number of embodiments of the invention have been illustrated and described and each of which is effective in providing adequate fuel pressure under all ambient conditions. In addition, one embodiment provides a cold starting arrangement wherein unregulated fuel pressure is supplied to the engine for cold starting. Although a number of embodiments of the invention have been illustrated and described, various changes and modifications may be made without departing from the spirit and scope of the invention, as defined by the appended claims.

I claim:

1. In a fuel supply system for operating an internal combustion engine from a separate container filled with a pressurized gaseous fuel, said separate container being insertable as a separate unit insertable into a supply system for said engine, means for sensing the pressure in said container when installed in said system, and means for heating said fuel when the pressure is below a predetermined value.

2. In a fuel supply system as set forth in claim 1 wherein the amount of heat applied to the fuel varies in inverse proportion to the pressure of the fuel.

3. In a fuel supply system as set forth in claim 2 wherein the means for heating the fuel is an electric heater.

4. In a fuel supply system as set forth in claim 2 wherein the means for providing the electricity for the electric heater is generated by the engine.

5. In a fuel supply system as set forth in claim 3 wherein the electric heater is operated by a battery.

6. In a fuel supply system as set forth in claim 5 wherein the battery is charged from the engine.

7. In a fuel supply system as set forth in claim 1 wherein the means for heating the fuel is an electric heater.

8. In a fuel supply system as set forth in claim 7 wherein the means for providing the electricity for the electric heater is generated by the engine.

9. In a fuel supply system as set forth in claim 7 wherein the electric heater is operated by a battery.

10. In a fuel supply system as set forth in claim 9 wherein the battery is charged from the engine.

11. In a fuel supply system as set forth in claim 1 wherein the heat for the fuel is supplied from heat extracted from the engine.

12. In a fuel supply system as set forth in claim 11 wherein the amount of heat applied to the fuel varies in inverse proportion to the pressure of the fuel.

13. In a fuel supply system as set forth in claim 12 wherein the heat is supplied from the engine to the fuel by means of a ducted passageway including a fan.

14. In a fuel supply system as set forth in claim 11 wherein the heat is supplied from the engine to the fuel by means of a ducted passageway including a fan.

15. In a fuel supply system as set forth in claim 1 further including a fuel pressure regulator interposed between the container and the engine for regulating the pressure of the fuel supplied to the engine from the container and further including cold starting means for supplying unregulated fuel under pressure from the container to the engine for cold starting.

* * * * *